United States Patent

[11] 3,612,401

[72] Inventors Peter H. Ellis;
　　　　　　　Samuel I. Persky, both of Chula Vista, Calif.
[21] Appl. No. 6,694
[22] Filed Jan. 29, 1970
[45] Patented Oct. 12, 1971
[73] Assignee Rohr Corporation
　　　　　　　Chula Vista, Calif.

[54] THRUST-REVERSING APPARATUS FOR TURBOFAN JET ENGINE
5 Claims, 7 Drawing Figs.

[52] U.S. Cl. .................................................. 239/265.29, 60/229
[51] Int. Cl. ...................................................... B64c 15/04
[50] Field of Search ............................................ 239/265.19, 265.25, 265.27, 265.29, 265.31, 265.33; 60/228, 229, 230, 39.23

[56] References Cited
UNITED STATES PATENTS
3,475,913  11/1969  Mortlock et al. .............. 60/229
3,483,702  12/1969  Ward ........................... 60/229
3,036,431  5/1962   Vdolek ......................... 60/39.23 X Primary Examiner—M. Henson Wood, Jr.
Assistant Examiner—Thomas C. Culp, Jr.
Attorney—George E. Pearson ABSTRACT: Turbofan jet engine fan air is discharged through passage between engine housing and cowling spaced therearound. Doors are pivoted to inner and outer sides of cowling adjacent aft edges of openings spaced circumferentially thereof and move between a retracted position closing the openings and a deployed position extending laterally therefrom, the inner doors blocking the fan air passage and deflecting fan air through the openings in the deployed position and the outer doors deflecting the fan air forwardly to reverse thrust. During deployment the inner doors completely block fan air passage only after outer doors are fully deployed, and when doors are retracted the inner doors open the fan air passage slightly before outer doors begin to close.

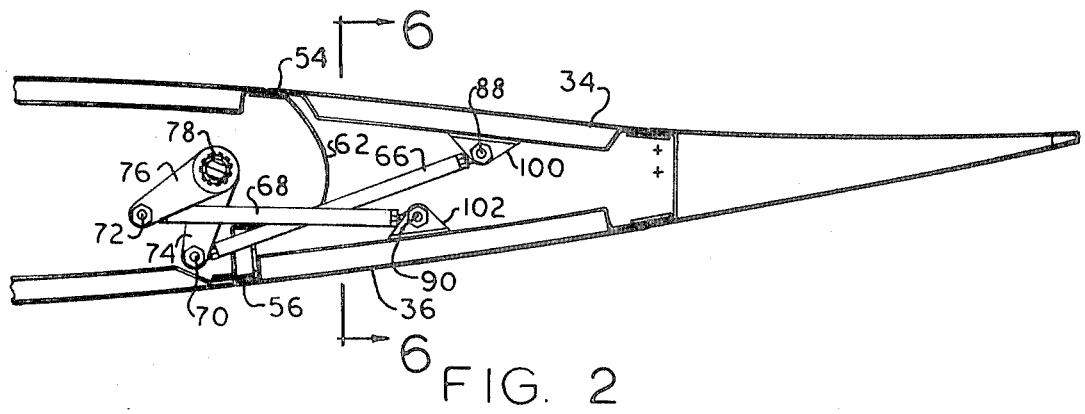
FIG. 2
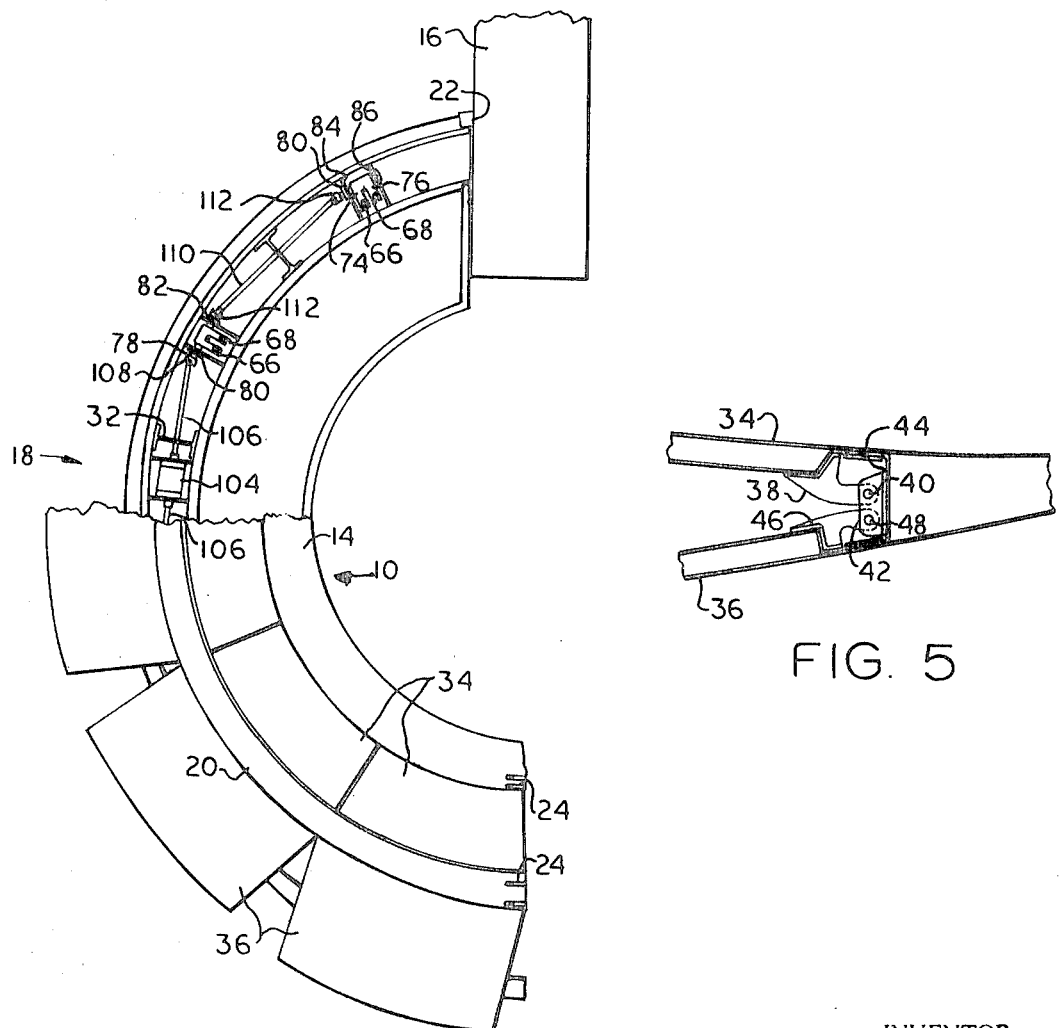
FIG. 5
FIG. 7
INVENTOR.
PETER H. ELLIS
SAMUEL I. PERSKY
BY Edwin D. Grant
ATTORNEY

INVENTOR.
PETER H. ELLIS
SAMUEL I. PERSKY

BY Edwin D. Grant
ATTORNEY

INVENTOR.
PETER H. ELLIS
SAMUEL I. PERSKY
BY
Edwin D. Grant
ATTORNEY 3,612,401

THRUST-REVERSING APPARATUS FOR TURBOFAN JET ENGINE

SUMMARY OF THE INVENTION

This invention relates to thrust reversing apparatus for an aircraft turbofan jet engine, and more particularly to such apparatus which changes the direction of flow of engine fan air to effect thrust reversal.

Apparatus which reverses the flow of fan air of a turbofan jet engine to obtain thrust reversal has been used heretofore. However, known arrangements for this purpose have not been entirely satisfactory due to various reasons, including their inability in certain cases to deflect the fan air forwardly at an angle which will provide effective thrust reversal. Some of the previously proposed fan air thrust reversers also comprise excessively complicated and heavy components, as well as actuating mechanisms which interfere with the normal flow of fan air when in the retracted position.

In accordance with the invention disclosed herein, thrust-reversing doors are pivoted to the inner and outer sides of a tubular cowling that is concentrically spaced around a turbofan jet engine housing, pairs of said doors being respectively located adjacent openings circumferentially spaced about the cowling. When the doors are in a retracted position they close the openings in the cowling and fan air of the jet engine is discharged to the atmosphere through the passage between the cowling and the engine housing. When the doors are deployed to their thrust-reversing position they swing away from the wall of the cowling and uncover the openings therein, the inner doors deflecting fan air through the latter and the outer doors turning the flow of fan air forwardly relative to the cowling at an angle which provides effective thrust reversal. The actuating mechanism which develops the doors rotates the outer doors to their deployed position before the inner doors completely block the fan air passage, and when the doors are retracted the same mechanism rotates the inner doors away from their deployed position before the outer doors begin to close. The outer doors are provided with sideplates which tend to keep the fan air flowing along said doors when they are deployed. The described apparatus is light in weight, uncomplicated in construction, and does not interfere with fan airflow when in the inoperative configuration. Thus the invention provides an improved means for reversing the thrust of a turbofan jet engine by reversing the direction of flow of its fan air.

DESCRIPTION OF THE DRAWINGS

FIG. 2 is a fragmentary sectional view of two of the thrust-reversing doors in their retracted position;

FIG. 5 is a fragmentary sectional view of two of said doors, illustrating the hinges therefor;

FIG. 7 is a combined rear elevation and sectional view taken along the plane represented by line 7—7 in FIG. 1 and in the direction indicated by arrows connected thereto.

DETAILED DESCRIPTION

Figure 1:
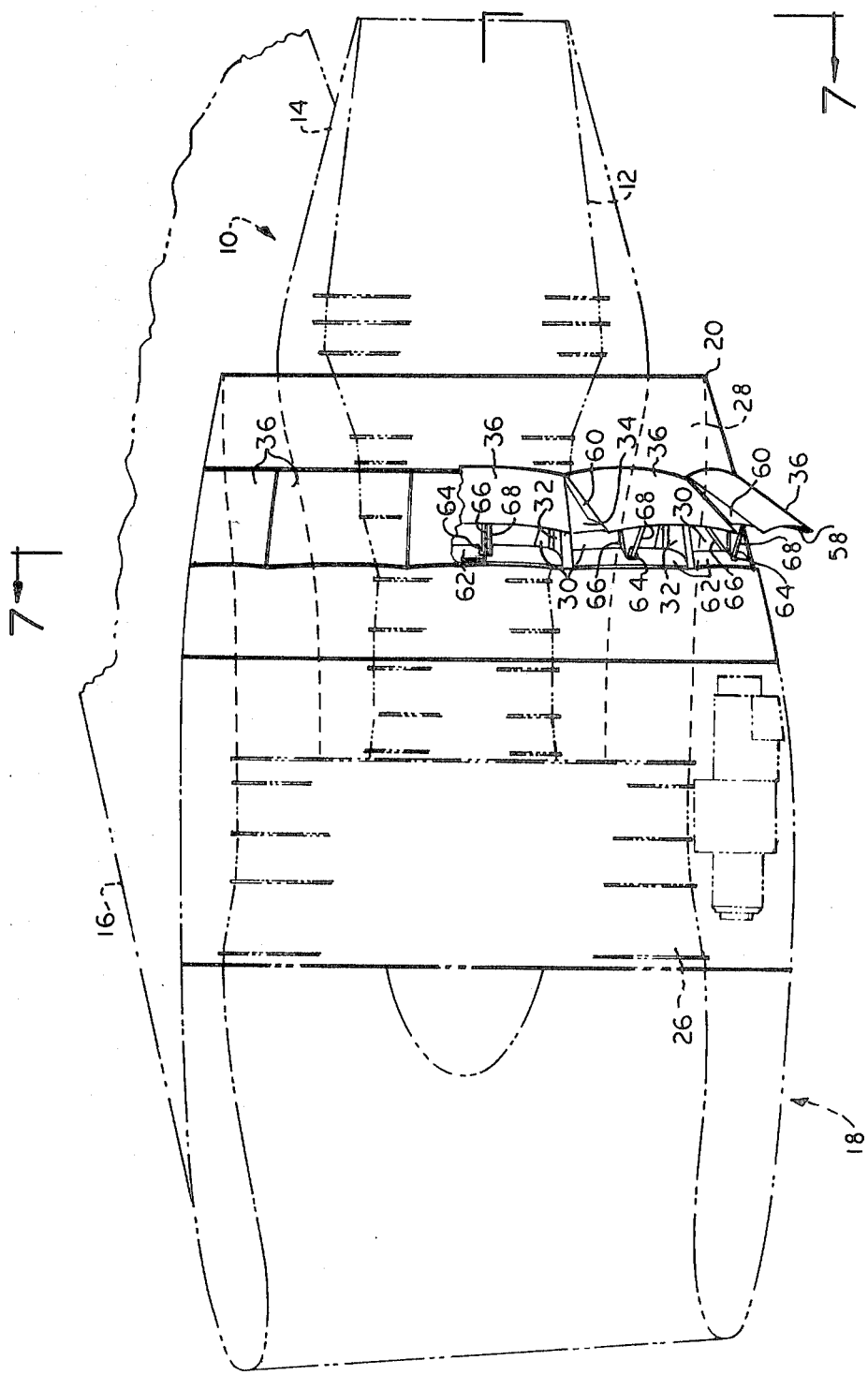
FIG. 1 is a side elevation of the preferred embodiment of the present invention, some of the thrust-reversing doors which are incorporated in said embodiment being illustrated in the retracted position thereof and others of said doors being illustrated in the deployed position thereof, all of the doors being simultaneously moved between the two positions in the actual operation of the apparatus.

In the drawings reference number 10 designates generally a tubular housing which encloses a turbofan jet engine 12 and the aft end of which defines a thrust nozzle 14 for discharge of the exhaust gas of said engine. In the illustrated embodiment of the invention housing 10 is mounted on a pylon 16 depending from a wing (not shown) of an aircraft. Also mounted on pylon 16 and concentrically spaced around housing 10 is a tubular cowling, designated generally by reference number 18. More particularly, cowling 18 is formed of two substantially hemicylindrical sections 20 (only one shown) which are respectively pivoted at their upper longitudinal edges 22 to opposite sides of the pylon and the lower longitudinal edges of which are in abutment when the cowling is secured by locking members 24 in its illustrated operational configuration. The forward end of the cowling projects forwardly from the fan section 26 of engine 12, and its aft end terminates at a plane located upstream from the aft end of housing 10 and disposed perpendicular to the common longitudinal axis of said housing and said cowling. Thus there is a passage 28 between the housing and the cowling through which fan air of the engine is discharged to the atmosphere.

Figure 6:
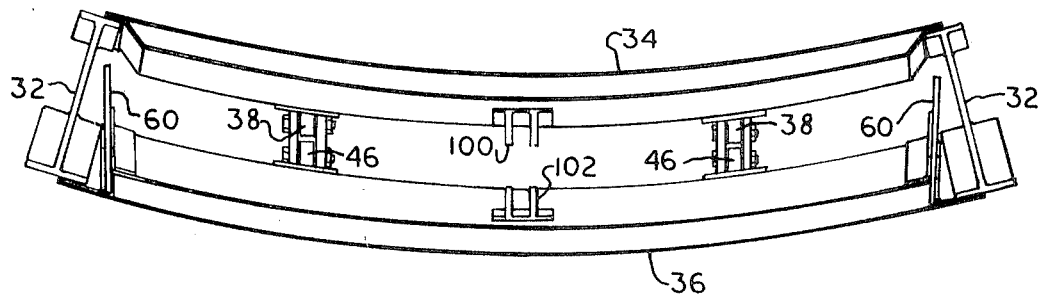
FIG. 6 is a cross-sectional of a typical pair of the doors, taken along the plane represented by line 6—6 in FIG. 2 and showing sidewalls thereof which are not seen in FIGS. 2–5 wherein components not on the section planes are omitted in order to simplify the drawings.

Circumferentially spaced around cowling 18 adjacent its aft end are a plurality of openings 30. These openings are separated from one another by narrow, longitudinally extending wall members 32, and their forward and aft edges are substantially disposed in planes perpendicular to the longitudinal axis of the cowling. A pair of thrust-reversing doors 34, 36 are respectively located on the inner and outer sides of the cowling adjacent each opening therein. More specifically, as illustrated in FIG. 5 a pair of mounting lugs 38 (only one shown) project from the aft edge of each door 34 at opposite sides thereof, and a pivot pin 40 extends through a hole in each of these lugs and into a hole formed in a bracket 42 mounted on the aft edge 44 of the opening 30 with which said door is aligned, the two pivot pins of each door 34 being coaxial. Likewise, a pair of mounting lugs 46 (only one shown) project from the aft edge of each door 36 at opposite sides thereof, and a pivot pin 48 extends through a hole in each of these lugs and into a hole formed in bracket 42, the two pins of each door 36 being coaxial. Thus, both the inner doors 34 and the outer doors 36 are arranged to pivot about axes lying in planes perpendicular to the longitudinal axis of the cowling and located adjacent the aft edges of openings 30, which permits movement of the doors between a retracted position (the upper doors being illustrated in this position in FIG. 1) an a deployed position (the lower doors being illustrated in this position in FIG. 1). It will be seen that each door is shaped to conform with the curvature of the cowling when in the retracted position, with the free end of each door 34 then abutting a recessed portion 54 of the inner surface of the cowling at the forward edge of the associated opening 30, the free end of each door 36 abutting a recessed portion 56 of the outer surface of the cowling at said forward edge, and the side edges of the doors respectively lying over the recessed longitudinally extending edges of wall members 32. Hence doors 34, 36 close the openings in the cowling when in the retracted position. It will also be seen that the inner doors are shaped so that in the deployed position their free ends lie adjacent the curved surface of housing 10 and their side edges are respectively disposed adjacent one another, said inner doors being inclined forwardly from the aft edges of the openings in the cowling. When deployed the outer doors 36 are swung outwardly from openings 30 and are also inclined forwardly from the aft edges thereof, and there are narrow gaps between their side edges as can be seen in FIG. 1. Deflector plates 58 are respectively fixedly mounted on, and extend across, the inner side of the outer doors at the free ends thereof, each plate being perpendicular to the door on which it is mounted. In addition, a sideplate 60 (see FIG. 6) extends along each side edge of each outer door and is fixedly attached thereto in perpendicular relation with the adjacent portion of the inner surface of the door.

Figure 3:
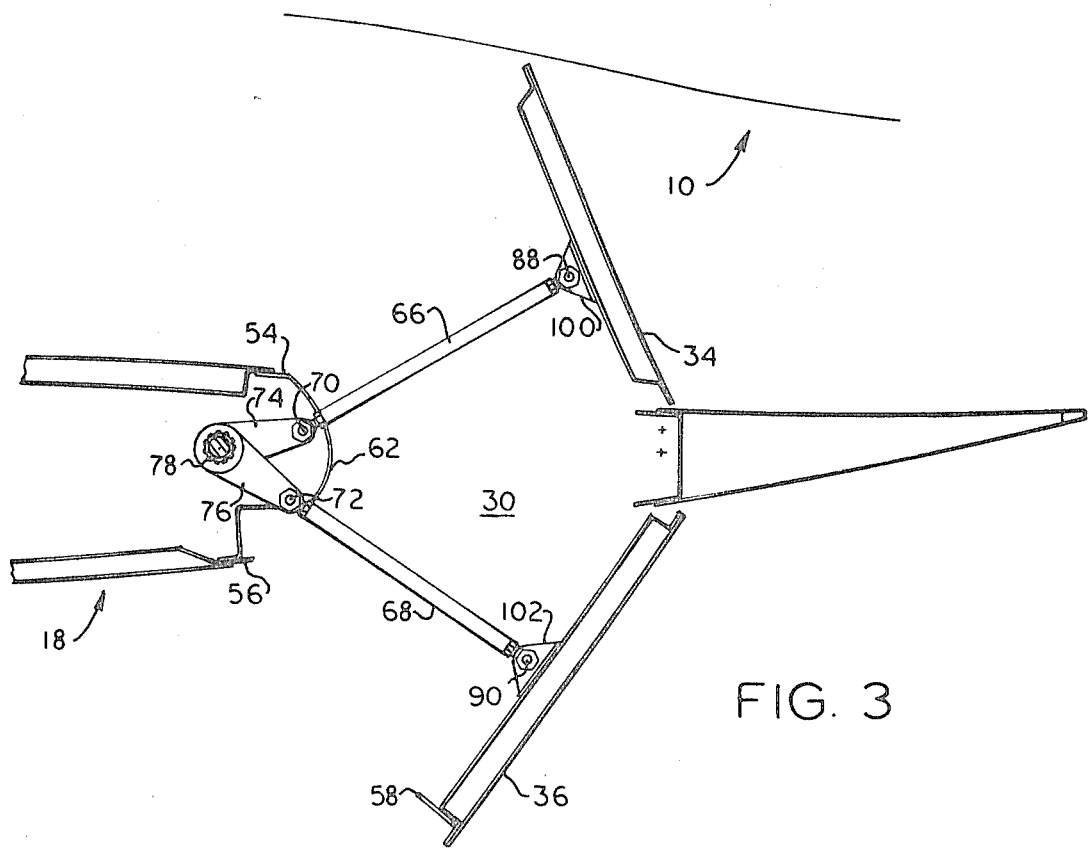
FIG. 3 is a second view taken at the same plane as that of FIG. 2, illustrating the position assumed by the doors just before they reach their deployed position.
Figure 4:
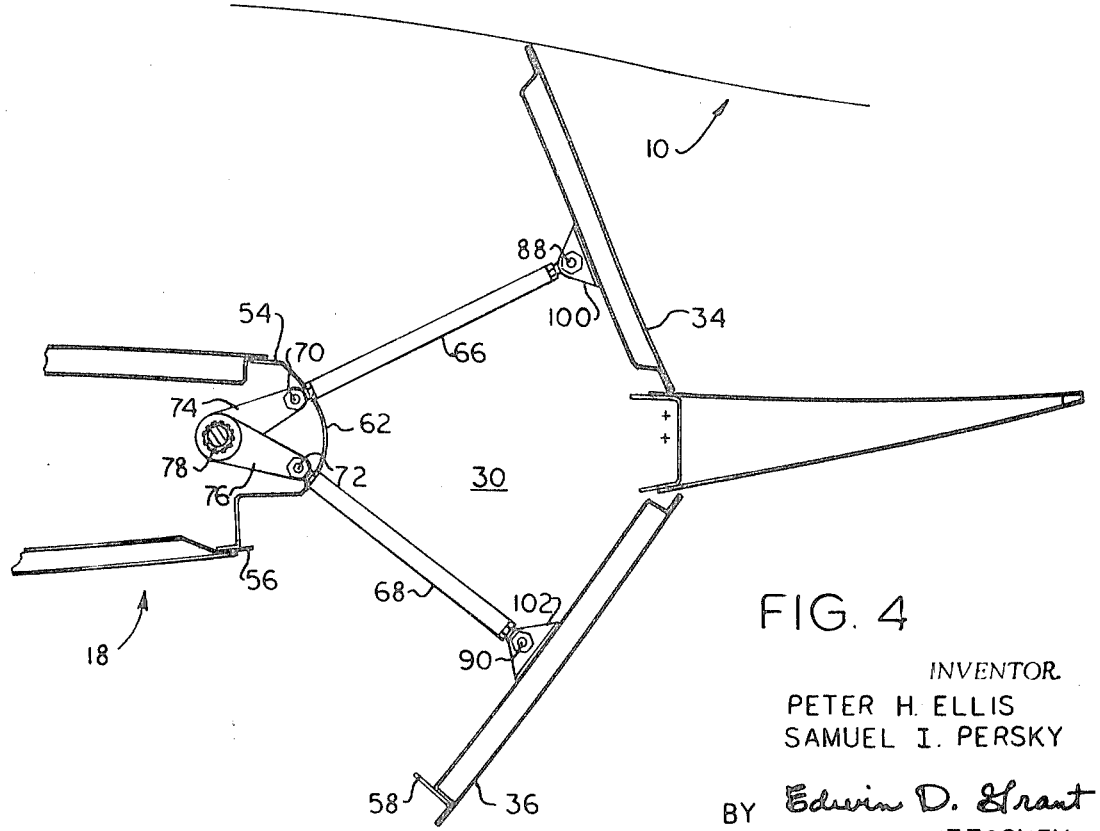
FIG. 4 is a third view taken at the same plane as that of FIG. 2, illustrating the deployed position of the doors.

FIGS. 2-4 show the cross-sectional shape of a fairing 62 which projects rearwardly from the inner and outer portions of the forward edge of each opening 30 in cowling 18. A radially extending slot 64 (see FIG. 1) is formed in the wall of each fairing at the middle thereof, and first and second links 66, 68 pass through this slot and are pivoted by means of pivot pins 70, 72 to first and second lever arms 74, 76 fixedly connected at one end to a drive shaft 78 mounted within the fairing for rotation about its longitudinal axis. The ends of each drive shaft 78 are journaled in bearings 80, 82 fixed to support members 84, 86 within fairing 62, with lever arms 74, 76 being situated between said bearings and the ends of the drive shaft projecting from the other side thereof. The other ends of each pair of first and second links 66, 68 are respectively pivoted to the adjacent pair of inner and outer doors 34, 36 by means of pivot pins 88, 90 which pass through holes in said links and holes in lugs 100, 102 respectively fixedly attached to the inner sides of said doors at the middle portion thereof. The longitudinal axes of drive shaft 78 and pivot pins 70, 72, 88 and 90 are parallel with the longitudinal axes of pivot pins 40 and 48, in the mounting and actuating assembly for each pair of inner and outer doors.

A drive motor 104 is mounted within each section 20 of cowling 18, and rods 106 are respectively connected to opposite ends of the drive shafts of said motors. The other ends of rods 106 are connected to universal joints 108 mounted on the adjacent ends of the drive shafts 78 which are nearest the motors. Rods 110 and universal joints 112 are also employed to interconnect the other drive shafts 78 in the two sections of the cowling with those next to the motors, opening of course being provided in wall members 32 for the rods 106, 110. Power for the motors is supplied through suitable conduits which extend through the cowling sections to pylon 16.

OPERATION

During all periods of operation of the illustrated and described jet propulsion assembly except when reversal of its thrust is required; first and second lever arms 74, 76 are positioned as illustrated in FIG. 2 and the first and second links 66, 68 respectively connected to said lever arms hold the inner and outer doors 34, 36 in the retracted position illustrated in he same drawing. It will be noted that the arrangement of the disclosed actuation mechanism is such that when the doors are retracted there is nothing within passage 28 to interfere with the flow of fan air, an advantage not provided with certain fan air thrust reversers of the prior art.

When reversal of thrust of the described propulsion assembly is required, motors 104 are operated to swing the lever arms 74, 76 on drive shafts 78 rearwardly from the position illustrated in FIG. 2. When the lever arms have rotated to the links illustrated in FIG. 3, each second link 68 is centered, or in line with, the second lever arm 76 to which it is connected (i.e., the longitudinal axes of said second link and said second lever arm, lie in the same plane), and therefore at this position each outer door 36 is rotated a maximum distance from cowling 18. However, at the same point in the rotation of the lever arms the first links are not yet in line with first lever arms 74 and the inner doors 34 are not fully deployed. As the lever arms continue to rotate toward the position illustrated in FIG. 4, the outer doors move slightly closer to the cowling while the inner doors continue to swing inwardly toward housing 10. When the lever arms reach the FIG. 4 position a limit switch (not shown) is actuated to stop motors 104. When the inner doors are fully deployed first links 66 are in line with lever arms 74 and the free ends of said doors are very close to the surface of housing 10. Thus fan air is then deflected from the inner doors through openings 30 and against the outer doors, the latter turning the fan air streams forwardly to thereby reverse the thrust thereof. A portion of the fan air flowing along each outer door impinges upon the deflector plate 58 thereon and is deflected laterally into the remainder of the fan air, so that the streams of fan air are turned forwardly more than they would be if the deflector plates were not provided on the outer doors. The sideplates 60 on the outer doors channel the streams of fan air along the doors and therefore reduce the loss of reverse thrust which would result from flow of fan air through the gaps between the edges of the outer doors.

When thrust reversal is no longer required motors 104 are operated to rotate the lever arms 74, 76 back to the FIG. 2 position, which initially moves the inner doors toward cowling 18 as the outer doors are moved away from said cowling and then simultaneously retracts both the inner and outer doors after they rotate past the position illustrated in FIG. 3. A second limit switch is actuated to stop motors 104 when the doors reach the retracted position.

The described actuation system is designed so that when the inner doors 34 are fully deployed the spacing between the outer doors 36 and cowling 18 accommodates the full flow of fan air from passage 28 without increasing the pressure within said passage to a level which might effect the speed of rotation of the fan of the jet engine within housing 10, and when the outer doors are in the position illustrated in FIG. 3 they are actually deployed farther than necessary. Thus when the doors are deployed the outer doors reach a position which can accommodate the flow of fan air from passage 28, without causing overpressure, before said passage is completely blocked by the inner doors. Also, when the doors are retracted the inner doors move away from housing 10 and partially open passage 28 before the outer doors begin to close openings 30. Hence the pressure within the portion of passage 28 forward of the inner doors remains substantially the same as the doors are being deployed and retracted.

What is claimed as new and useful and desired to be secured by U.S. Letters Patent is:

1. In an aircraft having a turbofan engine, the combination comprising:

a tubular housing fixedly disposed around said engine and extending aft of the fan section thereof, primary exhaust gas of said engine being discharged to the atmosphere from the aft end of said housing;

a tubular cowling fixedly disposed in spaced relation around said housing and defining therewith a passage through which fan air of said engine is discharged to the atmosphere, a plurality of openings being circumferentially spaced about and extending through the wall of said cowling aft of the fan section of said engine;

a plurality of inner-thrust-reversing doors circumferentially spaced about the inner side of said cowling and each pivoted at one edge thereof to said cowling adjacent the aft edge of a respective one of said openings, said inner doors being movable between (1) a retracted position wherein they extend longitudinally of said cowling and respectively lie over said openings and (2) a deployed position wherein they project inwardly from said cowling and their free ends are adjacent said housing so that fan air flowing through said passage is thereby deflected through said openings;

plurality of outer-thrust-reversing doors circumferentially spaced about the outer side of said cowling and each pivoted at one edge thereof to said cowling adjacent the aft edge of a respective one of said openings, said outer doors being movable between (1) a retracted position wherein they extend longitudinally of said cowling and respectively lie over said openings and (2) a deployed position wherein they project outwardly from said cowling and deflect in a forward direction fan air flowing through said openings; and means operatively associated with said inner and outer doors for simultaneously moving the same between said retracted and deployed positions thereof, said means being arranged so that during deployment said inner doors reach said deployed position thereof after said outer doors are fully deployed and so that during retraction said inner doors move away from said deployed position thereof before said outer doors move toward said cowling.

2. The combination defined in claim 1 wherein said means for moving said inner and outer doors between said retracted and deployed positions thereof comprise:

a drive shaft mounted on said cowling adjacent the forward edge of each opening therein and rotatable about its own longitudinal axis, said axis being substantially parallel with the axis of rotation of the adjacent pair of inner and outer doors;

means for simultaneously rotating said shafts in the same direction at a selected time;

first and second lever arms fixedly connected at one end to each drive shaft and extending laterally therefrom;

first and second links respectively pivoted at one end to the free ends of each associated pair of said first and second lever arms for rotation about axes substantially parallel with the longitudinal axis of the shaft on which said lever arms are mounted, the other ends of said first and second links being respectively pivoted to the adjacent pair of said inner and outer doors, said first and second lever arms being positioned on their drive shafts so that when said doors are deployed said second links are respectively centered relative to said second lever arms before said first links are centered relative to said first lever arms.

3. The combination defined in claim 1 wherein sidewalls extend along the longitudinally extending edges of each of said outer doors, said sidewalls being mounted on the inner side of said outer doors and disposed substantially perpendicular to the adjacent portion thereof.

4. The combination defined in claim 1 wherein deflector plates are respectively fixedly mounted on the inner side of said outer doors adjacent the free ends thereof, said deflector plates extending circumferentially of said outer doors and being disposed substantially perpendicular thereto.

5. In an aircraft having a turbofan engine, the combination comprising:

a tubular housing fixedly disposed around said engine and extending aft of the fan section thereof, primary exhaust gas of said engine being discharged to the atmosphere from the aft end of said housing;

a tubular cowling fixedly disposed in spaced relation around said housing and defining therewith a passage through which fan air of said engine is discharged to the atmosphere, a plurality of openings being circumferentially spaced about and extending through the wall of said cowling aft of the fan section of said engine;

a plurality of inner thrust reversing doors circumferentially spaced about the inner side of said cowling and each pivoted at one edge thereof to said cowling adjacent the aft edge of a respective one of said openings, said inner doors being movable between (1) a retracted position wherein they extend longitudinally of said cowling and respectively lie over said openings and (2) a deployed position wherein they project inwardly from said cowling and their free ends are adjacent said housing so that fan air flowing through said passage is thereby deflected through said openings;

a plurality outer thrust reversing doors circumferentially spaced about the outer side of said cowling and each pivoted at one edge thereof to said cowling adjacent the aft edge of a respective one and said openings, said outer doors being movable between (1) a retracted position wherein they extend longitudinally of said cowling and respectively lie over said openings and (2) a deployed position wherein they project outwardly from said cowling and deflect in a forward direction fan air flowing through said openings;

sidewalls respectively extending along the longitudinal edges of each of said outer doors and projecting inwardly from the inner side thereof in substantially perpendicular relation therewith;

said outer doors adjacent the free ends thereof respectively having deflector plates fixedly mounted on the inner sides thereof, said deflector plates extending circumferentially of said outer doors and being disposed substantially perpendicular thereto; and means operatively associated with said inner and outer doors for simultaneously moving the same between said retracted and deployed positions thereof.